Dec. 23, 1930.       C. E. LINEBARGER       1,785,963
              ELECTRIC STORAGE BATTERY
           Filed Dec. 19, 1925    2 Sheets-Sheet 1

INVENTOR:
Charles E. Linebarger
BY E. J. Andrews
ATTORNEY.

Dec. 23, 1930.  C. E. LINEBARGER  1,785,963
ELECTRIC STORAGE BATTERY
Filed Dec. 19, 1925   2 Sheets-Sheet 2

INVENTOR:
Charles E. Linebarger
BY
ATTORNEY.

Patented Dec. 23, 1930

1,785,963

UNITED STATES PATENT OFFICE

CHARLES E. LINEBARGER, OF CHICAGO, ILLINOIS

ELECTRIC STORAGE BATTERY

Application filed December 19, 1925. Serial No. 76,375.

This invention relates to improvements in electric storage batteries and has for one of its objects providing simple and convenient means for determining the density of the electrolyte in the battery.

In my Patent No. 1,424,730 I have illustrated and described certain hydrometric units which are called in the trade "Chaslyn balls", and which are used for determining the density of the electrolyte of batteries or other liquids, by immersing the balls in the liquid, the balls indicating the relative density of the liquid by rising or sinking in the liquid, as the case may be. In this manner the condition of charge of the battery may be readily determined. In that patent I described means for immersing the balls in the electrolyte and in this invention I not only describe means for immersing the balls in the liquid but provide means for attaching the immersing device directly to the battery, so that it will always be at hand for testing the density of the electrolyte, and so that the test may be very conveniently and quickly made.

Figure 1:
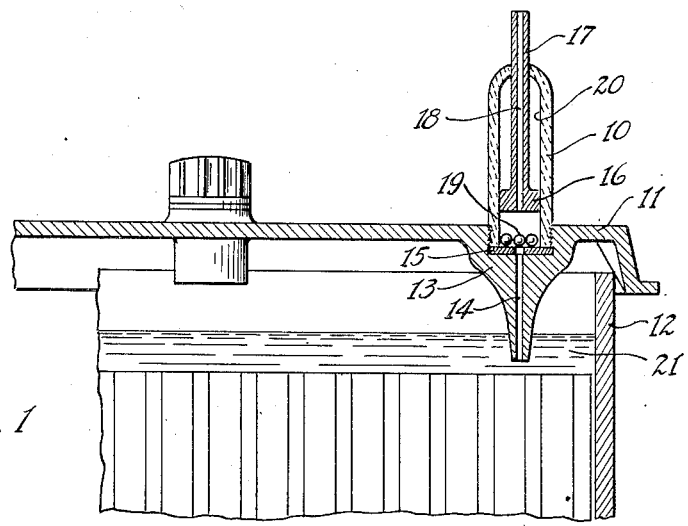
Figure 2:
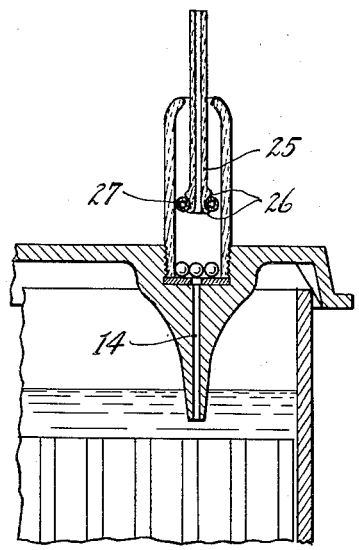
Figure 3:
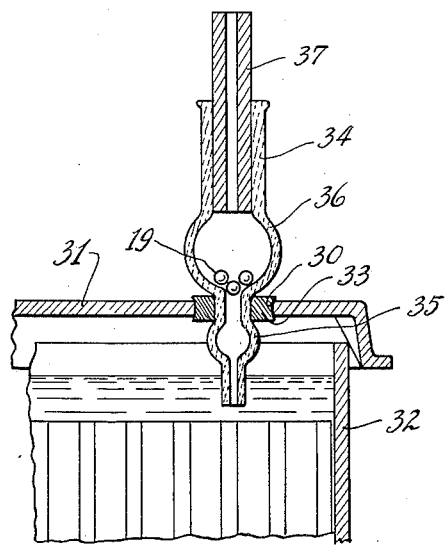
Figure 4:
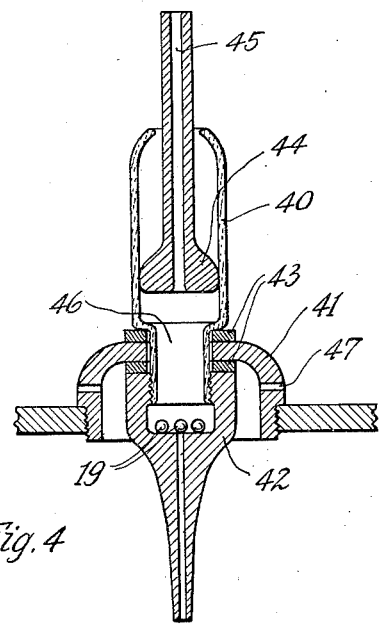
Figure 5:
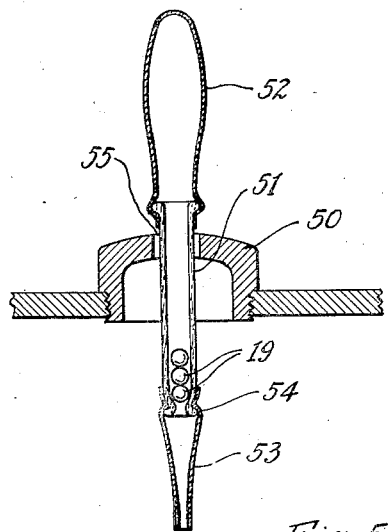

Of the accompanying drawings, Fig. 1 illustrates an indicating device mounted in the top of a storage battery, and Figs. 2 and 3 illustrate modifications of the device; all of which embody the features of my invention; and Figs. 4 and 5 illustrate other modifications which are mounted in the vent cap of the battery.

In my preferred form of indicating means illustrated in Fig. 1 the density indicating means comprise a transparent cylindrical member 10 fixed in the top 11 of the storage cell 12; and also fixed to the top 11 is a teat 13 extending downwardly with its lower end normally immersed in the electrolyte of the cell. A bore 14 extends entirely through the teat 13. A gasket 15 may be inserted above the teat, and the member 10 is screwed snugly down on this gasket. Mounted in the member 10 is a piston 16 which may be operated by means of a piston rod 17, and extending entirely through the piston and the rod is a bore 18. This piston and also the stem may be of any suitable material such as glass or rubber.

Contained in the cylinder 10, beneath the piston 16, are hydrometric units such as the "Chaslyn balls". These balls are of nearly the same density as the electrolyte, but ordinarily the densities of the balls are slightly less than the densities of the electrolyte when the battery is fully charged. The density of the balls varies slightly so that as soon as the battery is somewhat discharged, and the electrolyte becomes slightly less dense, one of the balls will sink. When the battery is materially discharged another of the balls will sink, and when the battery is entirely discharged a third ball will sink. So that when these balls are immersed in the liquid the condition of the charge of the battery may be at once determined.

In operation the bore 18 is closed by the finger of the operator and the piston pulled upwardly. This will cause the air pressure to force some of the liquid into the cylinder and thus immerse the balls in the liquid, and by observing the action of the balls with reference to the liquid the condition of charge may be determined. If the amount of electrolyte 21 is materially less than is normally required more or less air may be forced upwardly into the cylinder, as the projection 13 then may not extend far enough into the liquid to prevent the air being forced up. This will at once indicate to the observer that the battery is in need of a supply of water to maintain the proper amount of electrolyte in the battery.

Fig. 2 shows an indicating device similar to that of Fig. 1 except that the piston of the device comprises a glass rod 25 with annular ridges 26 at its lower end and a hollow rubber annular tube 27 mounted between the ridges forming the piston of the device. This piston makes a very simple, yielding, and effective means for preventing air from above passing downwardly into the lower end of the cylinder. It will be understood, however, that, with any of these devices, as soon as the finger is removed from the end of the piston rod the air entering the cylinder will allow the liquid in the cylinder to pass downwardly into the cell, the bore 14 being large enough to prevent any material capillary effect.

In Fig. 3 another modified form of the device is shown. In this case an opening 30 is formed in the top 31 of the cell 32 and a suitable rubber ring 33 is placed in the opening. A glass tube 34, having enlargements 35 and 36, is mounted in the opening of the ring, passing downwardly into the electrolyte. In the upper end of this tube is mounted a rubber tube 37. By closing the upper end of the tube 37 and pulling the tube upwardly the air in the enlarged portion 36 of the tube is reduced in pressure so that the electrolyte is forced up into this portion, immersing the balls 19 therein, so that the density of the liquid can be determined.

Figs. 4 and 5 illustrate other indicating devices which are installed in the vent cap of the cell. In case of Fig. 4 the glass cylinder 40 passes through an opening in the vent cap 41 and is threaded into a test tube 42, preferably of hard rubber or other similar material, gaskets 43 sealing the opening, so that when the piston 44 is pulled upwardly, with the bore 45 of the piston stem closed, some of the liquid of the cell will be forced into the chamber 46, immersing the balls 19 therein and the density of the liquid can be determined by the action of the balls in the electrolyte. A vent 47 may be formed in the cap to allow the gases to escape or the air pressure to be effective.

Fig. 5 shows a hydrometric device mounted in the vent cap 50. This device comprises a glass tube 51 with a rubber bulb 52 at its upper end and a teat 53 at its lower end, the balls 19 being retained in the tube by means of a constriction 54 at its lower end. The tube 51 passes freely through an opening 55 in the vent and by forcing the air out of the bulb 52 and then releasing the bulb the liquid from the cell will be forced into the tube 51, and by withdrawing the tube part way from the cap the action of the submerged balls 19 can be observed.

I claim as my invention:

1. The combination of an electric storage battery and liquid density indicating means, said battery having a vent cap with an opening in its upper wall, said indicating means being slidably mounted in said opening and extending downwardly to a point below the normal liquid level in said battery, a hydrometric unit in said tube beneath said opening, and means for reducing the air pressure in said indicating means.

2. The combination of an electric storage battery and a hydrometer, said battery having a vent cap with an opening in its upper wall, said hydrometer comprising a glass tube slidably projecting through said opening, said hydrometer extending downwardly to a point below the normal liquid level in said battery, a hydrometric unit in said tube adjacent to its lower end and beneath said cap, and means for reducing the air pressure in said tube.

In testimony whereof, I hereunto set my hand.

CHARLES E. LINEBARGER.